No. 747,611. PATENTED DEC. 22, 1903.
E. A. JOHNSTON.
CORN HARVESTER.
APPLICATION FILED FEB. 20, 1903.
NO MODEL. 7 SHEETS—SHEET 1.

Witnesses: Inventor:
E. A. Johnston
By Pennie & Goldsborough Attys

No. 747,611. PATENTED DEC. 22, 1903.
E. A. JOHNSTON.
CORN HARVESTER.
APPLICATION FILED FEB. 20, 1903.
NO MODEL. 7 SHEETS—SHEET 2.

No. 747,611. Patented December 22, 1903.

UNITED STATES PATENT OFFICE.

EDWARD A. JOHNSTON, OF CHICAGO, ILLINOIS.

CORN-HARVESTER.

SPECIFICATION forming part of Letters Patent No. 747,611, dated December 22, 1903.

Application filed February 20, 1903. Serial No. 144,214. (No model.)

*To all whom it may concern:*

Be it known that I, EDWARD A. JOHNSTON, a citizen of the United States, residing at Chicago, county of Cook, State of Illinois, have invented certain new and useful Improvements in Corn-Harvesters; and I do hereby declare the following to be a full, clear, and exact description of the invention, such as will enable others skilled in the art to which it appertains to make and use the same.

The invention relates more particularly to the class of machines known as "pickers" or "strippers," where the machine passes through the field astride a rod or rows and picks, snaps, or strips the ears from the stalks, leaving the latter standing, and the detached ears are carried rearward or to one side and delivered either to husking mechanism forming part of the machine or deposited in a suitable receptacle to be thence transferred to a separate husker.

The present machine employs the usual forwardly-projecting guiding and lifting prongs, with gathering and forwarding chains for straightening up the stalks. These prongs form a stalk passage-way extending rearward through the machine, and at one side of the passage-way between these prongs a rapidly-moving chain is arranged to travel, and the chain is provided with fingers suitably spaced apart, so that as the machine travels over the row the fingers engage the ears from beneath and snap them from the stalks. On the opposite side of the passage-way from the picker-chain a deflector is located, so as to press or incline the stalks over toward the picker-chain and cause the ears to be deflected sidewise into the path of the fingers on the chain, and alongside of the picker-chain and running along parallel with it there is a trough or conveyer which directs or carries the detached ears to a receptacle or second conveyer for delivering them at the side of the machine, where they may be received by a wagon-box or other receptacle that is drawn beside the machine. This second conveyer is combined with cleaning-rollers forming the bottom or a portion of the bottom of the conveyer-trough, the object being to separate the ears from the loose leaves, blades, and other trash that are unavoidably carried with them to the rear, thus cleaning the corn before it finally leaves the machine.

The invention is illustrated in the accompanying drawings, forming part of this specification, wherein—

Figure 1:
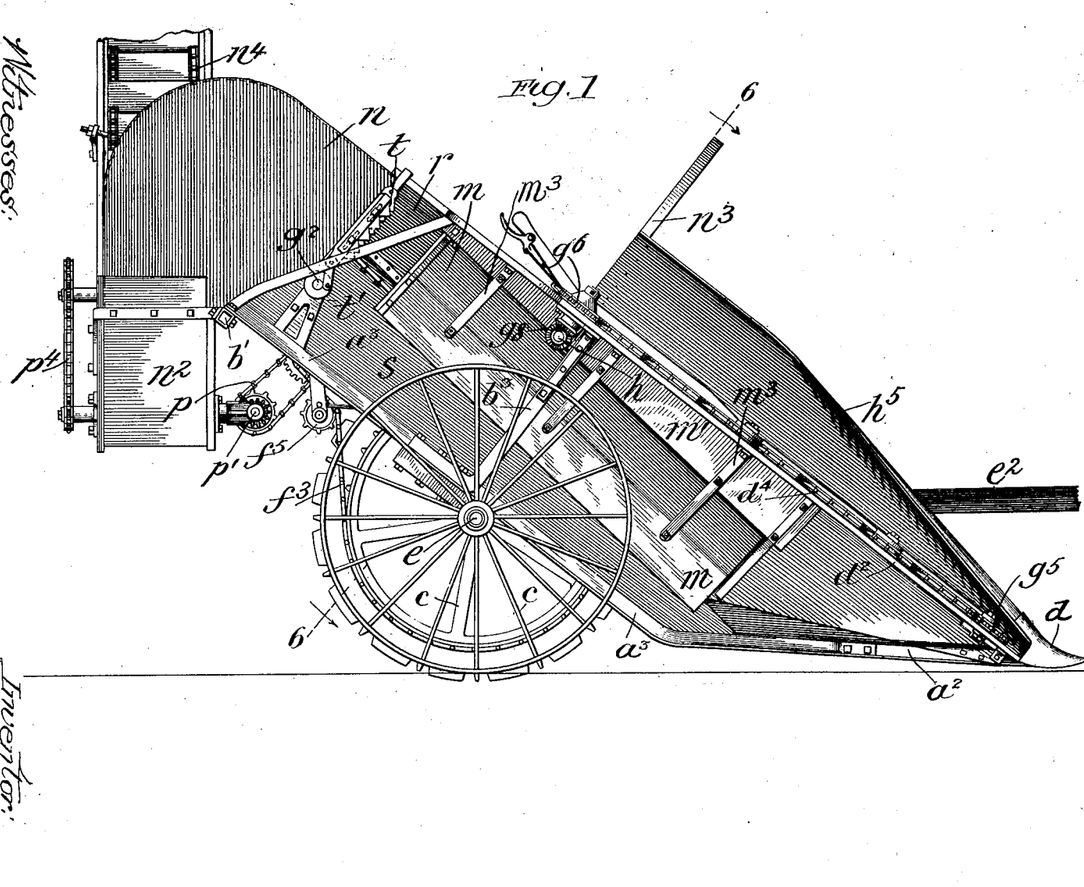
Figure 1 is a side elevation of the machine next the standing corn.
Figure 2:
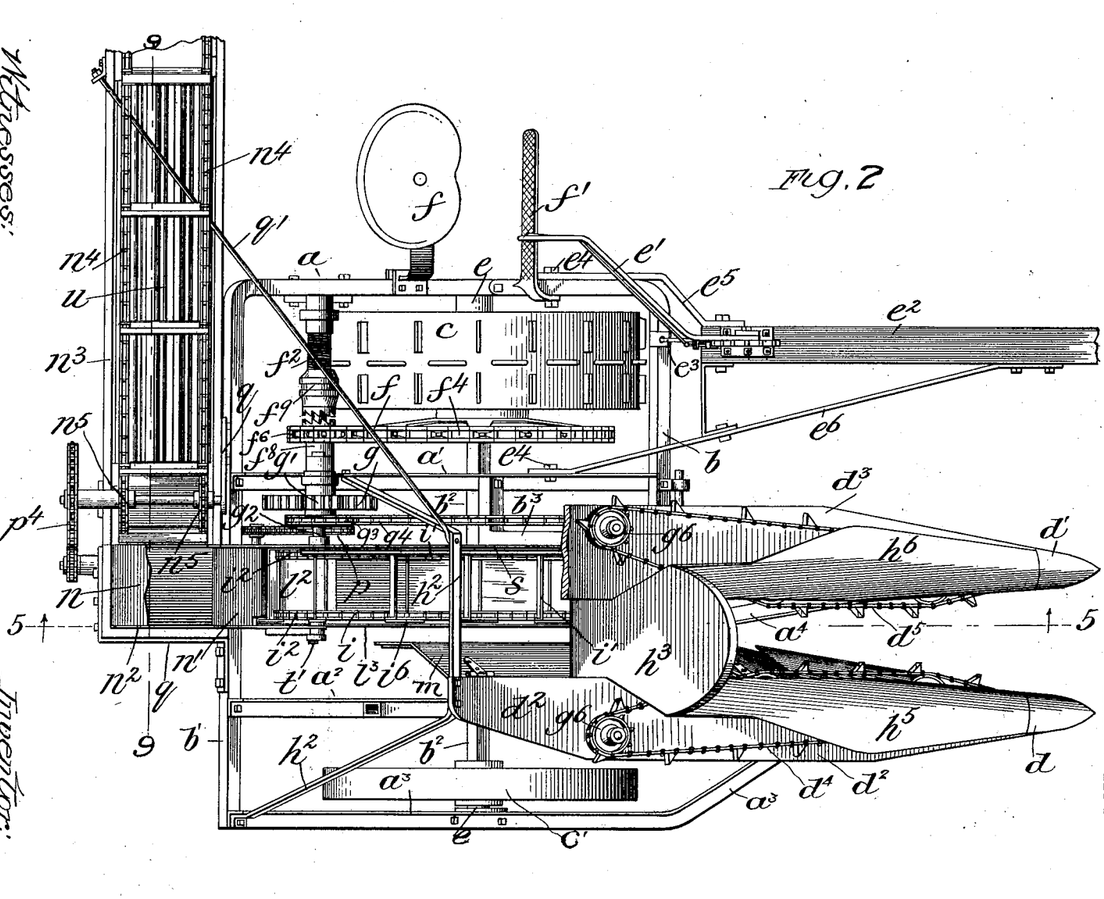
Fig. 2 is a plan view.
Figure 3:
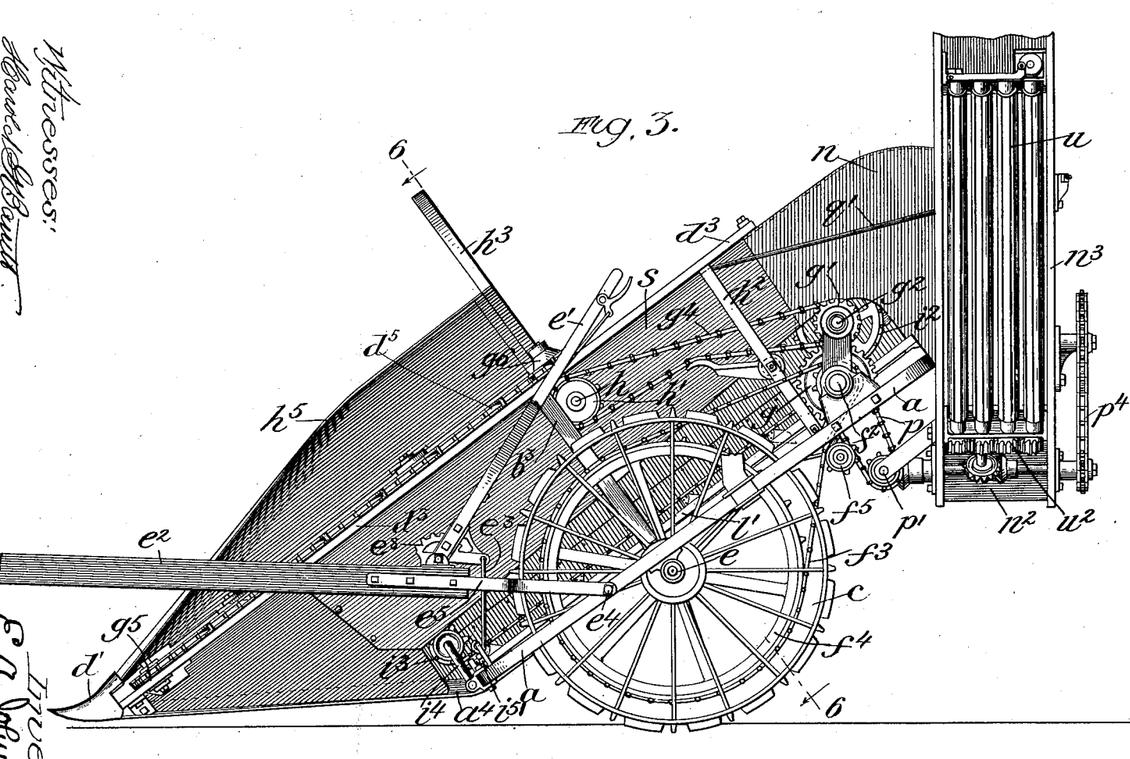
Fig. 3 is a stubble side elevation.
Figure 4:
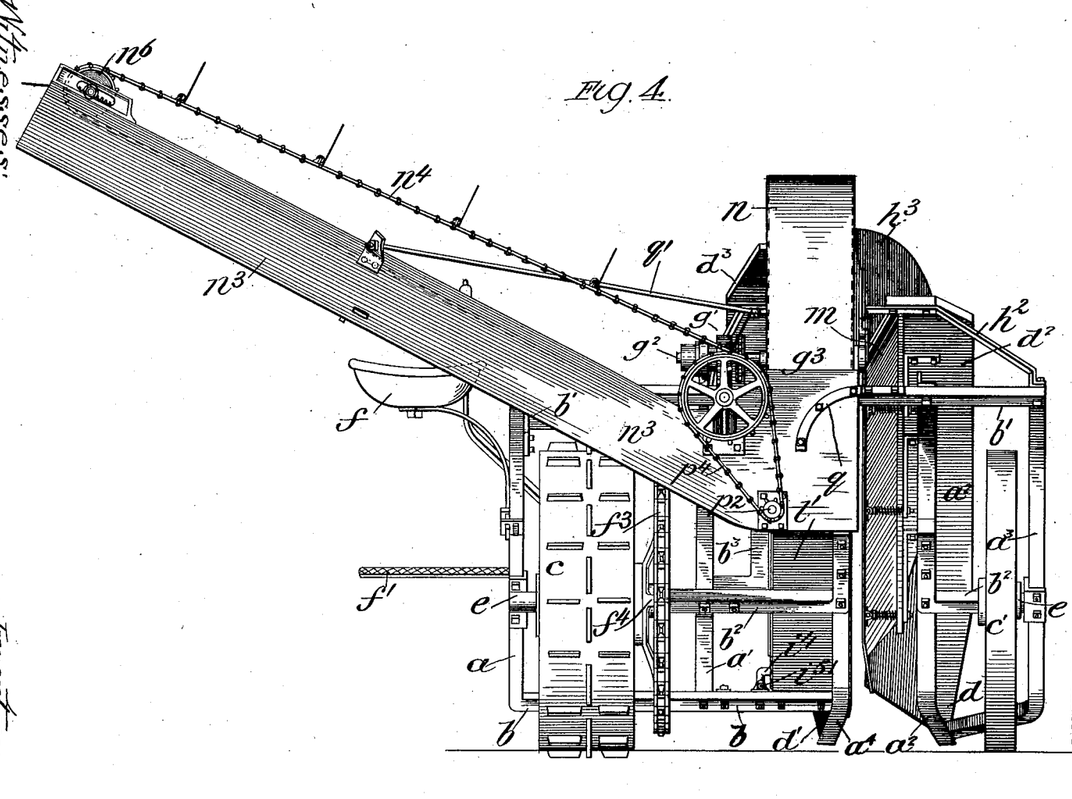
Fig. 4 is a rear elevation.
Figure 5:
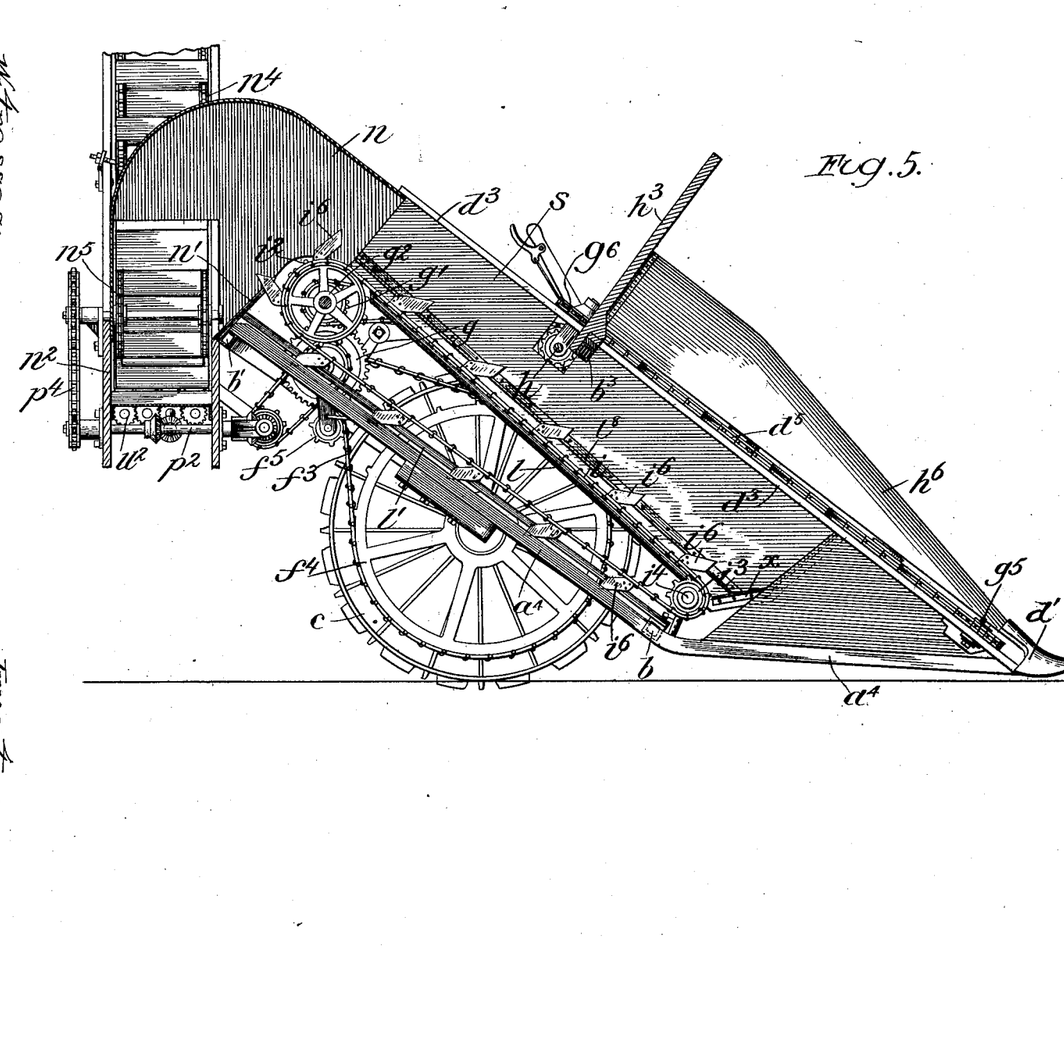
Fig. 5 is a longitudinal sectional elevation taken on the line 5 5 of Fig. 2.

Referring first to Figs. 1 to 6, the frame of the machine comprises the fore-and-aft bars $a$, $a'$, $a^2$, $a^3$, and $a^4$. These are connected at their ends to transverse front and rear bars $b\ b'$ and an intermediate transverse bar $b^2$, which is coincident with the axles of the supporting-wheels $c\ c'$, of which the former is the traction-wheel and supplies power to drive all the working parts of the machine. The rear frame-bar $b'$ is continued from one side bar to the other; but as the front of the machine has to be open to admit the standing stalks the front bar $b$ only extends from the traction-wheel side a short distance past the fore-and-aft bar $a'$, where it connects with the bar $a^4$. The frame-bar $a^3$ on the side of the machine next the unpicked corn is bent inward in front of the wheel $c'$, as shown in Fig. 2, and joins the front end of the fore-and-aft bar $a^2$, as shown in Fig. 1, so as to form the support for the outer guiding and lifting prongs $d$. The intermediate fore-and-aft bar $a^4$ extends from the rear cross-bar $b'$ forward past the end of the front cross-bar, as shown in Fig. 5, and forms a support for the inner guiding and lifting prong $d'$. The frame constructed as thus described inclines upwardly and rearwardly from the level of the front cross-bar $b$ and is supported on the axle $e$ so as to be tilted by means of a hand-lever $e'$. This lever is pivoted on the tongue $e^2$ near its rear end and is connected by a link $e^3$ to the cross-bar $b$ in front of the traction-wheel $e$ and below the point $e^4$ of connection of the tongue with the frame. The connection is made by means of braces $e^5$ $e^6$, which are rigidly connected to the tongue and pivoted to the fore-and-aft bars $a$ $a'$ of the frame, so that the inclination of the frame and the height of the prongs may be adjusted by locking the lever in different notches of the toothed quadrant $e^8$. The driver's seat $f$ is supported by the side bar $a$ in a position convenient to the hand-lever $e'$, and a foot-rest $f'$ is also secured to the side bar $a$ in front of the seat.

The portion of the frame on the traction-wheel side which supports the inner prong is rigidly connected to the portion on the outer wheel side which carries the outer prong by means of the arched cross-bar $b^3$, and the rear portions of the boards $d^2$ $d^3$, which carry the gathering-chains $d^4$ $d^5$, are supported by this arched bar, whence they extend downward and forward to the outer ends of the bars $a^2$ $a^4$, as best indicated in Figs. 1, 2, 4, and 5. This arched bar also has an additional function, which will be described later on, and the rear ends of the boards $d^2$ $d^3$ are continued rearward from the arch and supported by an arch $h^2$ of lighter construction, the lower ends of which are secured to the frame-bars $a'$ $a^3$. A segment-shaped board $h^3$ is secured at its lower end to the horizontal part of the arch $b^3$ and projects upwardly and forwardly, as best shown in Figs. 1 and 5. The sides of the board are inclined, as shown at $h^4$, Fig. 6, and covers or shields $h^5$ $h^6$, which cover and protect the gathering-chains, are secured at their rear ends to these inclined sides so as to form flaring sides to guide the ears into the hopper-shaped space between the boards. The boards and the arch close this space, so that the tops of the stalks are prevented from being inclined or prostrated rearwardly by the action of the fingers on the picker-chains, which will presently be described. Except for some obstruction at this point, such as the arch or the board, the fingers on the rapidly-moving chains, which travel upwardly and rearwardly, would probably incline the stalks so far rearward that the ears could not be picked off with certainty; but with the present construction this is entirely prevented, and the stalks are held upright or even given a slight forward inclination as the machine advances, so that the fingers on the picker-chains act on them throughout their whole length.

Power to drive the various parts of the machine is taken from a counter-shaft $f^2$, which is driven by a chain belt $f$ from a sprocket-wheel $f^4$, that is rigidly secured to the traction-wheel. The chain passes over a tightener $f^5$ and around a sprocket-pinion $f^6$, that is mounted on the inner end of a sleeve $f^8$, normally loose on the shaft $f^2$ and adapted to be locked thereto by a sliding clutch $f^9$.

The outer end of the counter-shaft has a gear $g$ on it, which meshes with a pinion $g'$ on the inner end of a shaft $g^2$, which is the drive-shaft of the picker and elevator chains, to be hereinafter described. The shaft $g^2$ also carries a sprocket-wheel $g^3$, around which runs a chain $g^4$, by means of which the gathering and forwarding chains $d^4$ $d^5$, heretofore described, are driven. These chains run around idle sprockets $g^5$ $g^5$ at the lower outer ends of the prongs and driving-sprockets $g^6$ $g^6$ at the upper rear ends of the boards $d^2$ $d^3$, the latter sprockets being carried by short vertical shafts that are driven by miter-gears $g^8$ $g^8$ from a shaft $h$, that is journaled in hangers depending from the under side of the boards $d^2$ $d^3$ at their upper ends. The shaft $h$ has a sprocket $h'$ on its inner end, around which the chain $g^4$, already described, runs at its front end, and thus drives the shaft $h$ from the upper shaft $g^2$.

Figures 6, 7, 8:
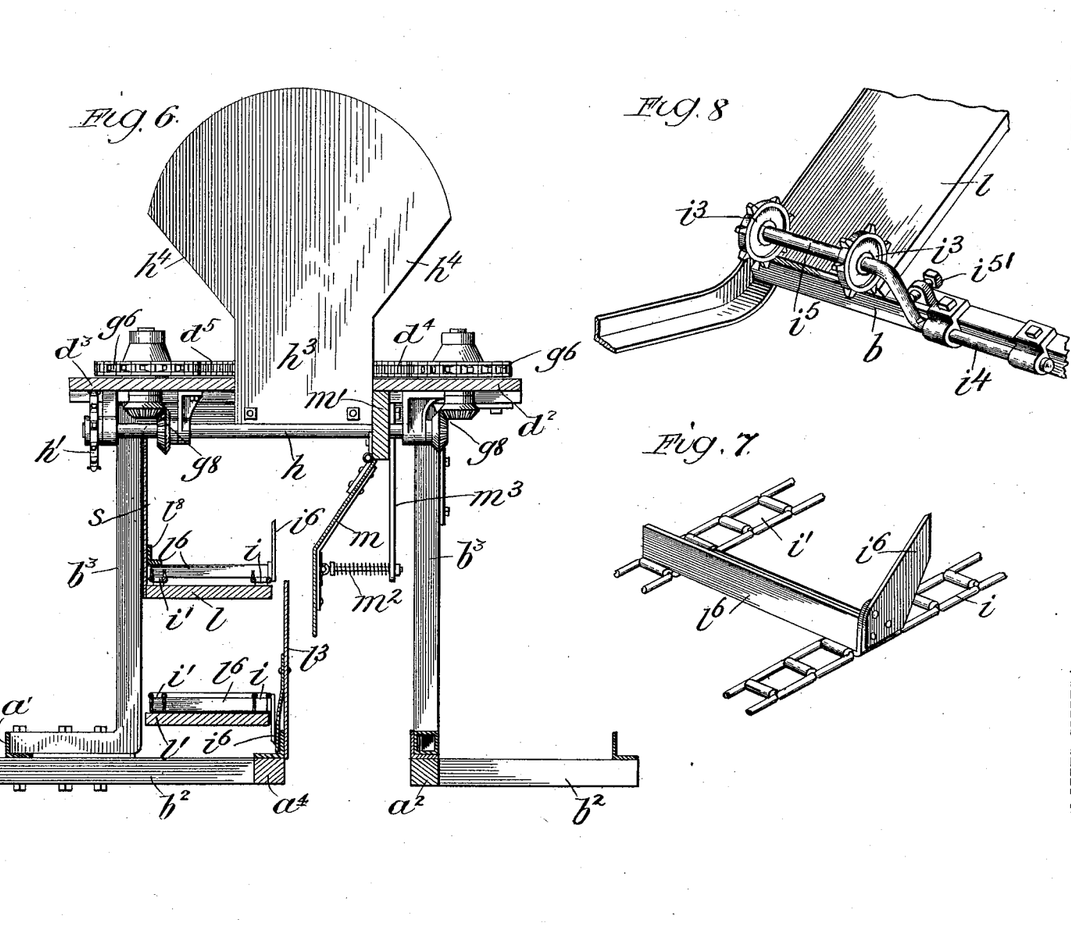
Fig. 6 is a transverse sectional elevation taken on the line 6 6 of Figs. 1 and 3.
Fig. 7 is a perspective view of the combined picker and conveyer chain.
Fig. 8 is a perspective view of the means for adjusting the combined picker and conveyer chain.

The picker-chain, already referred to, travels along at one side of the passage-way for the stalks, as best shown in Figs. 2, 5, and 6. The chain is denoted by $i$ in all the figures. It travels with the active ply above the return-ply and both plies moving in a plane parallel with and close to the side of the passage-way next the harvested or picked stalks. As here shown, it forms one part of a conveyer-chain $i'$, that runs parallel with it and being connected to it by cleats $l^6$ forms an ear-conveyer that receives the ears as they are knocked off the stalks by the picker-fingers and carries them upward and rearward to a receptacle or another conveyer that will be described latter on and by means of which they are delivered to the wagon-box or whatever other receptacle is provided to receive them. The picking function of the chain $i$ is quite distinct from its function as part of the conveyer, and it might be entirely separate from the conveyer-chain, especially if it were desired to drive the conveyer and picker at different speeds. As here shown, however, it and the conveyer-chain $i'$ form a combined ear picker and conveyer moving at one speed, which has been found to be the most convenient arrangement.

The chains $i$ $i'$ travel at their upper ends around a pair of large sprocket-wheels $i^2$ $i^2$ on the shaft $g^2$, already described, and at their lower ends they run over smaller sprockets $i^3$ $i^3$, journaled on the cranked part $i^5$ of a short shaft $i^4$, that is mounted in bearings secured to the front cross-bar $b$ of the machine-frame and is made adjustable, so as to tighten the chains by a set-screw $i^{5'}$, that works in a fixed bracket on the bar $b$ and bears against the angular part of the shaft, as clearly shown in Figs. 3 and 8.

As preferably arranged the picker travels rearward on a sharp upward inclination, as best shown in Fig. 5, owing to the different elevations of the sprocket-wheel at the upper and lower ends. It is provided with fingers $i^6$, that are permanently or otherwise secured to one side of the links of the chain, as shown in Fig. 7, and extend at such an angle to the chain that the upper edges of the fingers will preferably, though not necessarily, be substantially horizontal while they are moving upwardly. These fingers are suitably spaced apart on the chain, and as they move upward they strike the ears from below close to the stalk and by an upward shearing blow pick or snap the ears off by cutting or breaking the stems.

In their upward travel the picker and conveyer chains are preferably supported by an inclined board $l$, which also forms the bottom or flooring of the conveyer proper, and a similar board $l'$ is also advisedly located under the return-ply of the chains, as best shown in Figs. 5 and 6. The upper board when used spans the space between the sprockets at the lower end of the conveyer, and at the upper end of the conveyer the shaft $g^2$ is surrounded by a drum $l^2$, which closes the space between the upper wheels and serves the purpose of the bottom board $l$, where the chains pass around the upper wheels. The lower board $l'$ when employed serves to support the slack ply of the chain, and the picker-fingers on their downward travel move past the edge of the board, as indicated in Fig. 6, and they and the sprockets are protected from interference with the standing stalks by a shield or protector $l^3$, which is secured to the fore-and-aft bar $a^4$ and projects upward along one side of the stalk passage-way. Alongside of the picker and conveyer chain, away from the passage-way, there is provided a vertical wall $s$, which closes this side of the conveyer and prevents the chain from being deflected laterally out of its normal path of movement in operative relation to the stalks passing through the passage-way, and in order to prevent the resistance offered by the ears downwardly on the fingers from tipping the other side of the chain up there is a flange or ledge $l^8$, secured to the side wall so as to overhang the ends of the cleats of the chain $i'$.

As already described, the machine is provided on the opposite side of the stalk passage-way from the picker and conveyer with a deflector which leans the stalks over toward the picker-chain, so that the ears may hang over sidewise and be the more easily caught by the picker-fingers. This deflector is most conveniently made in the form of an apron $m$, that is hinged at its upper edge to a board $m'$, set vertically, as shown in Figs. 1 and 6, and extended along under the board $d^2$ of the prong that is on the outer side next the unpicked corn. The apron is bent laterally, as shown in Fig. 6, so that its lower portion stands normally in a position parallel with the shield $l^3$ on the opposite side of the passage-way, and it is pressed over toward the picker-chain by springs $m^2$, which react between the lower part of the apron and certain downhangers $m^3$, which depend from the board $m'$ for this purpose. The stalks are in this way pressed over against the shield $l^3$, so that the ears hang over into the path of the picker-fingers.

The upper end of the picker and conveyer where the chains turn around the drive-sprockets on the shaft $g^2$ is covered and protected by a housing $n$, having sides and a top, as shown in Figs. 1, 4, and 5. The top extends forward and downward to the rear end of the board $d^3$ on the inner side of the passage-way, and thus the picker and conveyer is covered throughout its length. The side of this housing next to the driver's side of the machine is continuous with the side board $s$ of the conveyer, (see Fig. 6,) so that on this side there is a closed wall to the conveyer throughout the length of the stalk passage-way clear to the transverse conveyer-casing. The other side of the conveyer, however, is necessarily open above the shield $l^3$ from the front end of the passage-way to the entrance to the housing $n$, (see Fig. 1,) and in order to prevent any portion of the tops and leaves from catching and hanging against the edge of this housing as they pass into the open mouth thereof a cutter $t$ is located just in front of the edge of the housing, as best shown in Fig. 1. Any form of cutter may be used at this point, and it may be positioned in any preferred manner; but as herein shown it consists of a vertically-positioned knife-bar having V-shaped sections working against a similar stationary bar having V-shaped teeth. The reciprocating bar is connected at its lower end to an eccentric-pin on a crank-disk on the outer end of the shaft $g^2$, which carries the upper sprocket-wheels of the picker and conveyer chains.

A chute-board $n'$ is secured to the rear cross-bar $b'$ of the machine-frame and projects upwardly toward the conveyer, so as to guide and direct the ears which fall on it into the end casing $n^2$ of a transverse conveyer $n^3$. This conveyer extends off toward the side of the machine next to the stripped stalks and is intended to carry and deliver the ears into the box of a wagon, which, as usual, is drawn along by the side of the machine; but it may deliver them into any other sort of a receptacle, if desired.

The transverse conveyer consists of a pair of ordinary chain belts $n^4$ $n^4$, that travel around sprocket-wheels $n^5$ $n^5$ and $n^6$ $n^6$ and are connected together by rods or slats $o$, carrying yielding paddles or cleats $o'$ to sweep the bottom of the conveyer-trough. The conveyer is driven from the shaft $f^2$, before described, by means of a chain $p$, which drives a short shaft $p'$, mounted in bracket-bearings underneath the upper end of the picker and conveyer-chains $i$ $i'$ and extending from the lower end of the trough or frame of the transverse conveyer. The shaft $p'$ is geared to a shaft $p^2$, journaled in the side boards of the conveyer-frame, and at its rear end this shaft has a small sprocket $p^3$, around which runs a chain $p^4$, which drives the shaft $p^6$, around which the lower end of the elevator-chains $n^4$ travel.

Figures 9, 10, 11, 12:
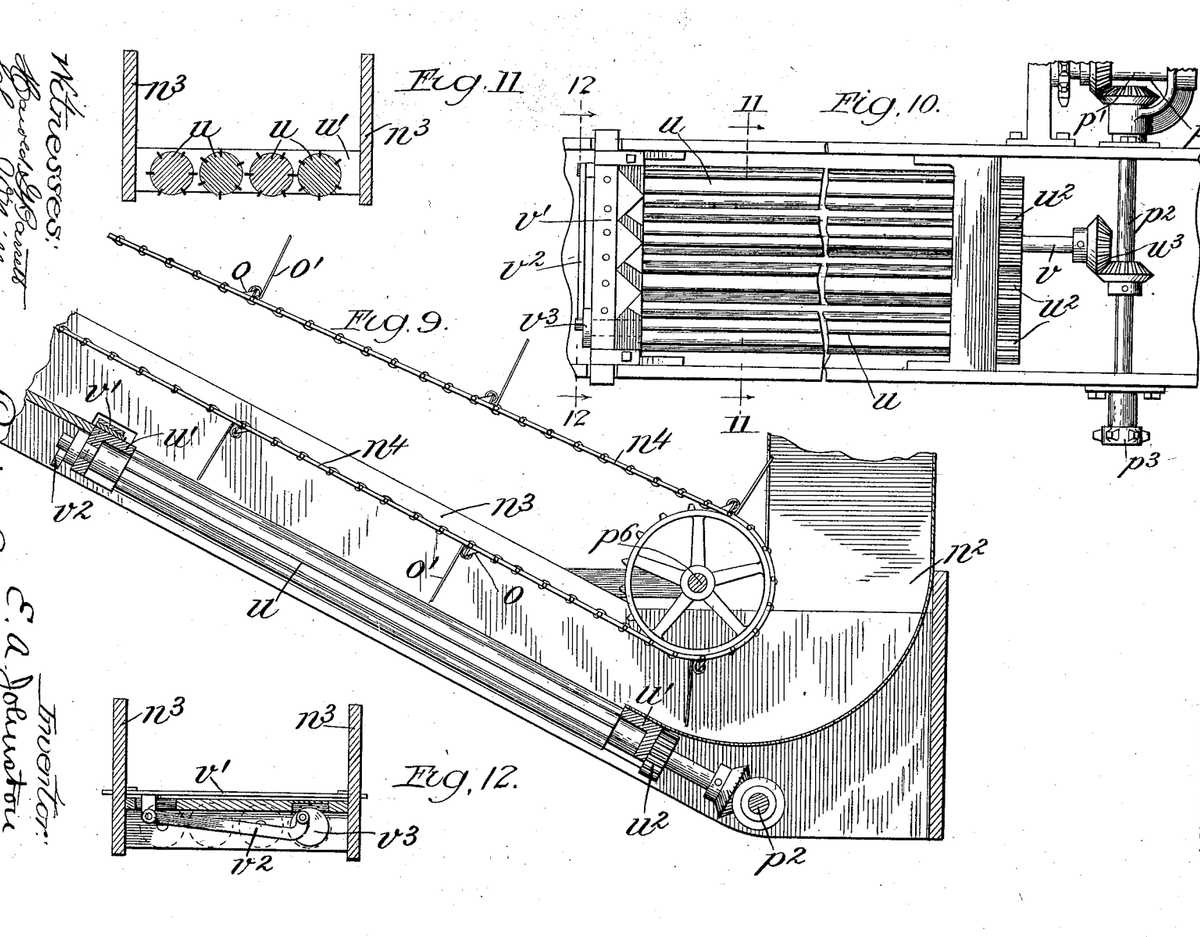
Fig. 9 is a longitudinal sectional elevation of the transverse conveyer, taken on the line 9 9 of Fig. 2, showing the cleaning-rolls.
Fig. 10 is a fragmentary plan view of the cleaning-rolls.
Fig. 11 is a transverse sectional elevation taken on the line 11 11 of Fig. 10.
Fig. 12 is a transverse sectional elevation taken on the line 12 12 of Fig. 2.

The frame or trough of the transverse conveyer is connected by suitable braces $q$ $q$ to the frame-bar $b'$ and its outer end is upheld by a tie-rod $q'$, leading to the arch $h^2$, to which the extreme rear ends of the prong-boards $d^2$ $d^3$ are fastened, and the bottom of the trough for a portion of its length is composed of one or more pairs of cleaning-rollers $u$, the rollers of each pair rotating in opposite directions. The rollers are journaled in cross-pieces $u'$ $u'$ under the conveyer-trough, and near their lower ends they are provided with intermeshing gears $u^2$ to give the desired rotation, and the series of rollers is driven from the shaft $p^2$, already described, by miter-gearing $u^3$, connecting with an extension $v$ of the shaft of one of the rolls, as clearly shown in Fig. 10. These rolls are not intended to husk the ears, but only to clean away any leaves, blades, loose husks, and other trash that may pass along with the ears into the transverse conveyer. Accordingly their surfaces are only made slightly aggressive, so as to draw this trash down between them as the ears are swept along over the rolls by the blades $o'$, and in order to prevent the clogging of this matter at the upper end of the rolls a second cleaning-knife $v'$ is arranged to be reciprocated across the floor of the conveyer-trough at the point indicated in Fig. 9. As here shown, this cleaning-knife is connected by a link $v^2$ to the wrist-pin of a crank-disk $v^3$ on the upper end of one of the cleaning-rolls. The knife $v'$, as here shown, is constructed like the cleaning-knife $t$, already described, which is located in front of the outer side wall of the housing $n$; but any other form of knife may be used at either point, if desired.

The construction and operation of the machine being as thus described, it only remains to note that as to many of the parts the invention is not limited to the details of construction herein shown, but is susceptible of considerable modification without departing from its spirit or scope. For example, although the board $l$, which supports the picker and conveyer chains $i$ and $i'$, is of wood and is discontinued at the upper sprocket-wheels of the chains and the shaft $g^2$ is inclosed by a drum the board might be made of metal and continued up and curved around the shaft to follow the path of the chains; also, that the combined ear-conveyer and picker might be provided with a bottom of its own made of canvas or other light material and the board $l$ dispensed with. It is also to be noted that the particular conveyer-chain for the ears is not an essential feature, as any other form of conveyer or even a trough or chute might be employed to conduct the ears from the picker to the second conveyer or to a receptacle.

In respect to the picking mechanism attention is called to the fact that the gearing for driving the shaft $g^2$ is so proportioned as to give the combined picker and conveyer chain a rapid motion compared to the speed of the gathering and forwarding chains on the prongs. This rapid motion of the picker-chain, together with the arrangement of the chain, causes the upper edges of the picker-fingers to strike the butts of the ears close to the stalks with an energetic action, which effectively snaps them off, leaving the stalks standing in the field, and it is to be further noted that the inclination of the chain here shown is merely for the purpose of illustration, as it may be positioned so as to travel at any angle between the horizontal and vertical that best suits the conditions.

Having thus described my invention, what I claim is—

1. In a corn-harvester, the combination of a frame having an opening in its front side, lifting and guiding prongs projecting forwardly one on each side of the opening, and forming a passage-way for the corn, an arched bar connecting the parts of the frame on opposite sides of the opening, gathering-boards carried by said prongs and supported by the arched bar at the rear, gathering and forwarding devices carried by said boards, and flaring shields or covers overlying the gathering-boards and covering and protecting the gathering and forwarding devices, said shields forming hopper-shaped sides to the upper edges of the corn passage-way between the prongs, and said opening being closed at the rear.

2. In a corn-harvester, the combination of a frame having an opening in its front side, lifting and guiding prongs projecting forwardly one on each side of the opening, and forming a passage-way for the corn, an arched bar connecting the parts of the frame on opposite sides of the opening, gathering-boards carried by said prongs and supported by the arched bar at the rear, gathering and forwarding devices carried by said boards, an upwardly-projecting board secured to the arched bar and closing the rear end of the passage-way at the top, and flaring shields or covers overlying the gathering-boards and covering and protecting the gathering and forwarding devices, said shields forming hopper-shaped sides to the upper edges of the corn passage-way between the prongs.

3. In a corn-harvester, the combination of a frame having an opening in its front side, lifting and guiding prongs projecting forwardly one on each side of the opening, and forming a passage-way for the corn, and provided with gathering and forwarding devices, an arched bar connecting the parts of the frame on opposite sides of the opening, an upwardly-projecting board secured to the bar and closing the rear end of the passage-way at the top, and having outwardly-inclined sides, and flaring shields or covers for the gathering and forwarding chains, said covers being secured to the inclined sides of the upright board and projecting forwardly over and along the prongs.

4. In a corn-harvester, the combination of a frame, having an opening in its front side, lifting and guiding prongs projecting forwardly one on each side of the opening, and provided with boards $d^2$, $d^3$, and gathering and forwarding chains $d^4$, $d^5$, carried by said boards, the arched bar $b^3$ to the horizontal part of which the boards $d^2$, $d^3$, are secured, an upstanding board $h^3$ secured at its lower end to the bar between the boards $d^2$, $d^3$, and having inclined sides, and covers $h^5$, $h^6$, for the chains $d^4$, $d^5$, secured at their rear ends to said inclined sides so as to flare outwardly, and projecting forwardly over and along the prongs.

5. In a corn-harvester, a rectangular frame, comprising fore-and-aft side bars $a$, $a^3$, and intermediate bars $a^2$, $a^4$, a rear cross-bar $b'$ continuous from one side bar to the other, and a front cross-bar $b$ extending from the side bar $a$ to the intermediate fore-and-aft bar $a^4$ so as to leave an opening at the front side of the machine between the bars $a^2$, $a^4$, an arched bar $b^3$ uniting the parts of the frame on opposite sides of the opening, extensions of the bars $a^2$, $a^4$ forward of the front cross-bar $b$, and prong-boards $d^2$, $d^3$ secured at their rear ends to the arched bar $b^3$ and at their forward ends to the bars $a^2$, $a^4$.

6. In a corn-harvester, the combination of a stalk passage-way, and means for picking the ears from the standing stalks as they pass through the passage-way, said means consisting of a picker-chain provided with fingers traveling along one side of the way with one ply over the other and both plies moving parallel to said way.

7. In a corn-harvester, the combination of a stalk passage-way, means for picking the ears from the standing stalks as they pass through the way, said means consisting of a picker-chain provided with fingers traveling alongside of the way with one ply over the other and both plies moving parallel to the way, and means for conducting the ears away.

8. In a corn-harvester, the combination of a stalk passage-way, means for picking the ears from the standing stalks as they pass through the way, said means consisting of a picker-chain provided with fingers traveling along one side of said way, and means preventing the chain from being deflected out of its normal line of travel.

9. In a corn-harvester, the combination of a passage-way for the stalks, a chain traveling along one side of said passage-way and having fingers to pick the ears from the stalks, and an ear-conveyer traveling rearward alongside the picker-chain.

10. In a corn-harvester, the combination of a passage-way for the stalks, and a combined ear picker and conveyer, consisting of parallel chains $i$, $i'$, traveling along one side of the passage-way, ear-picking fingers $i^6$ secured to the chain $i$, and cleats or paddles $l^6$ connecting the chains.

11. In a corn-harvester, the combination of a passage-way for the stalks, a combined ear picker and conveyer consisting of parallel chains $i$, $i'$, traveling along one side of said passage-way, ear-picking fingers secured to the chain $i$, cleats or paddles connecting the chains, and a flange or ledge overlying the chain $i'$ and serving to prevent the resistance offered by the ears from tipping up the chain.

12. In a corn-harvester, the combination of a passage-way for the stalks, a combined ear picker and conveyer consisting of parallel chains $i$, $i'$, traveling along one side of said passage-way, ear-picking fingers secured to the chain $i$, cleats or paddles connecting the chains, a vertical wall $s$ along the outer side of the chain from the passage-way to prevent the chain being deflected from its normal line of travel, and a flange or ledge secured to the wall and overhanging the chain $i'$ to prevent the chain being tipped by the resistance offered by the ears.

13. In a corn-harvester, the combination of a stalk passage-way, means for picking the ears from the standing stalks as they pass through the passage-way, said means consisting of a chain provided with fingers traveling along one side of said way, and a deflector on the opposite side of the way to push the stalks over so that the ears will be deflected into the path of the fingers.

14. In a corn-harvester, the combination of a passage-way for the stalks, a chain traveling along one side of said way and provided with fingers to pick the ears, a shield between the passage-way and the chain, and a deflector on the opposite side of the way to push the stalks over against the shield so that the ears will be deflected into the path of the fingers.

15. In a corn-harvester, the combination of a passage-way for the stalks, a combined ear picker and conveyer, consisting of parallel chains $i$, $i'$, traveling rearwardly and upwardly along one side of the passage-way, ear-picking fingers $i^6$ secured to the chain $i$, a bottom board to support both chains, cleats or paddles $l^6$ connecting the chains, a shield $l^3$ at the side of the passage-way to protect the return ply of the picker-chain, a hinged ear and stalk deflector $m$ on the opposite side of said passage-way, and springs $m^2$ to press the deflector toward the shield.

16. In a corn-harvester, the combination of a combined ear picker and conveyer, consisting of parallel chains $i$, $i'$, connected together by cleats or paddles $l^6$, and the chain $i$ having fingers $i^6$, a shaft $g^2$ having sprocket-wheels around which the upper ends of the chains travel, and a shaft $i^4$ having sprocket-wheels around which the lower ends of the chains travel, said shaft $i^4$ provided with means to adjust the lower sprocket-wheels and tighten the chains.

17. In a corn-harvester, the combination of a combined ear picker and conveyer, consisting of parallel chains $i$, $i'$, connected together by cleats or paddles $l^6$, and the chain $i$ having fingers $i^6$, a shaft $g^2$ having sprocket-wheels around which the upper ends of the chains travel, and a shaft $i^4$ having sprocket-wheels around which the lower ends of the chains travel, said shaft $i^4$ having a cranked portion $i^5$ on which its sprocket-wheels are journaled, and a set-screw $i^{51}$ bearing against the angular part of the shaft to adjust the sprocket-wheels and tighten the chains.

18. In a corn-harvester, the combination of a passage-way for the stalks, an ear-picker located at one side thereof, and a knife or cutter positioned at or near the rear of the picker.

19. In a corn-harvester, the combination of a passage-way for the stalks, means for picking the ears from the standing stalks as they pass through the passage-way, said means consisting of a picker-chain traveling along one side of said way, and a cleaning-knife or cutter located at the rear of said chain.

20. In a corn-harvester, the combination of a stalk passage-way, an ear-picker on one side of said way, an ear-conveyer working alongside of said picker, an ear and stalk deflector on the other side of said way, a housing for the conveyer and picker having one of its side walls terminating in rear of the deflector, and a cleaner positioned in front of said wall.

21. In a corn-harvester, the combination of a passage-way for the stalks, an ear-picker chain traveling upwardly and rearwardly along one side of said way, an ear-conveyer traveling alongside of said chain, a housing for the rear end of the conveyer having one of its side walls terminating at the rear of the passage-way slightly forward of the rear end of the conveyer, and a cleaner located in front of said side wall.

22. In a corn-harvester, the combination of a passage-way for the stalks, an ear-picker chain traveling along said way, an ear-conveyer traveling along said chain on the opposite side from said way, a stalk-deflector on the opposite side of the way from the picker-chain, a housing at the rear end of the conveyer and picker having one side wall closed and extending forward along the ear-conveyer and the other side wall terminating at the rear end of the passage-way in a plane close to that of the picker-chain, and a cutter to clean away the tops and leaves that catch against the edge of said last-mentioned side wall as the stalks pass rearward through the passage-way.

23. In a corn-harvester, the combination of an ear-conveyer trough, rollers in the bottom of the trough for cleaning the ears as they pass through the conveyer, and a cleaning-knife or cutter working transversely of the trough at the upper end of the rollers.

24. In a corn-harvester, the combination of an ear-conveyer comprising a trough and an overhead conveyer-chain, pairs of rollers lengthwise the trough in the bottom thereof, and a cleaning-knife at the upper end of the rollers.

In testimony whereof I affix my signature in presence of two witnesses.

EDWARD A. JOHNSTON.

Witnesses:
WILLIAM WEBBER,
CHAS. N. CHAMBERS.